United States Patent
Härtel et al.

(10) Patent No.: US 6,444,107 B2
(45) Date of Patent: Sep. 3, 2002

(54) METHOD AND DEVICE FOR THE SIMULTANEOUS PRODUCTION OF ACID AND BASE OF HIGH PURITY

(75) Inventors: Georg Härtel, Freiberg; Christian Bienhüls, Meitingen; Jürgen Künzel, Thierhaupten, all of (DE)

(73) Assignee: SGL Technik GmbH, Meitlingen (DE)

( * ) Notice: Subject to any disclaimer, the term of this patent is extended or adjusted under 35 U.S.C. 154(b) by 0 days.

(21) Appl. No.: 09/776,965

(22) Filed: Feb. 5, 2001

(30) Foreign Application Priority Data

Feb. 4, 2000 (DE) .......................... 100 04 878

(51) Int. Cl.$^7$ .............................................. C02F 1/469
(52) U.S. Cl. ...................................... 204/531; 204/542
(58) Field of Search ................................. 204/523, 531, 204/542, 522

(56) References Cited

U.S. PATENT DOCUMENTS

| | | | |
|---|---|---|---|
| 4,212,712 A | | 7/1980 | Murayama et al. ............ 204/98 |
| 5,536,384 A | * | 7/1996 | Thompson et al. ........... 204/522 |
| 6,294,066 B1 | * | 9/2001 | Mani ........................... 204/523 |

FOREIGN PATENT DOCUMENTS

| | | |
|---|---|---|
| DE | 1 211 597 | 3/1966 |
| DE | 26 52 771 A1 | 6/1977 |
| DE | 39 26 642 C2 | 3/1990 |
| DE | 42 01 494 C2 | 2/1993 |
| GB | 2 131 049 A | 6/1984 |

OTHER PUBLICATIONS

"Elektrodialyse mit bipolaren Membranen" [electrodialysis with bipolar membranes], 2 pages, http://www.igb.fhj.de/MuPT/dt/Elektrodialyse_m–Bipol.html (undated).

* cited by examiner

Primary Examiner—Bruce F. Bell
Assistant Examiner—Thomas H. Parsons
(74) Attorney, Agent, or Firm—Laurence A. Greenberg; Werner H. Stemer; Gregory L. Mayback

(57) ABSTRACT

An electrodialytic method and device for the simultaneous production of acids and bases of high purity and higher concentration operates by splitting corresponding salts in aqueous solution using an electrolysis cell. The electrolysis cell includes a cathode chamber in which an alkali is formed, a salt chamber for supplying a salt to be split, an acid chamber in which the acid is formed, and an anode chamber through which a mineral acid flows as a proton carrier. The anode is a hydrogen-consuming electrode. The method and device are preferably used in the production of hydrochloric acid and sodium hydroxide solution.

11 Claims, 3 Drawing Sheets

METHOD AND DEVICE FOR THE SIMULTANEOUS PRODUCTION OF ACID AND BASE OF HIGH PURITY

BACKGROUND OF THE INVENTION

1. Field of the Invention

The invention relates to a method for the simultaneous production of acid and base of high purity through the electrodialytic splitting of a corresponding salt in aqueous solution using an electrodialysis cell. The invention also relates to an electrodialysis cell for carrying out the method.

2. Description of the Related Art

In a number of chemical process steps, salt solutions accumulate and, as such, are not directly used further or cannot or should not be introduced into a drainage canal as waste either. Furthermore, salt solutions with high concentrations are obtained in leaching processes of salt deposits or in the leaching of salts which are already conveyed as well as pure prepared salts. In many cases, it is in the interest of chemical engineering and economy to produce from such salt solutions more highly refined valuable substances in the form of acids and bases corresponding to the ions of the respective salt. Electrolytic or electrodialytic methods are frequently used for that purpose. The known electrodialytic methods used for that purpose operate with a three-chamber system (see report of Fraunhofergesellschaft: Institut für Grenzflächen- und Bioverfahrenstechnik [Fraunhofer Association: Institute for Interface and Bio-Material Processing], April 1999, "Elektrodialyse mit bipolaren Membranen" [Electrodialysis with Bipolar Membranes]).

In that respect, the salt solution which is to be prepared electrodialytically is conducted through a middle chamber of an electrodialysis cell being formed of three chambers. The cations travel from that cell, under the influence of the electrical field, through a cationic exchanger membrane into an adjacent chamber which contains the cathode, and form the base there with cathodically developed $OH^-$-ions. Accordingly, the anions travel through an anionic exchanger membrane into the adjacent anode chamber on the other side and form the corresponding acid with the $H^+$-ions developed anodically there. However, the production methods of acids and bases from salt solutions, which operate according to that method, have disadvantages. One disadvantage resides in the fact that unwanted reactions with anions take place at the anode, which lead to the contamination of the acid being formed. In that way, for example, hydrohalic acids, formed in the anode chamber with free halogens which are produced at the anode by the discharging of halide ions, are contaminated and their service value is therefore reduced. Moreover, the anode can be corrosively attacked or the ion exchanger membranes can be damaged by the halogen being released. Another disadvantage resides in the fact that the anodically formed acids are frequently not sufficiently concentrated and are therefore of little value in terms of chemical engineering and commerce.

In U.S. Pat. No. 4,212,712 a method is described for the electrodialytic production of a more highly concentrated sodium hydroxide solution from sodium chloride solutions in a three-chamber cell. However, with that method, hydrochloric acid is not directly electrodialytically formed, but instead, chlorine is separated anodically. The intermediate chamber lying between the anode chamber and the cathode chamber is separated from both adjacent chambers by cationic exchanger membranes which, in addition to being permeable to the $Na^+$-ions, are permeable to water to differing degrees. The permeability to water is less towards the cathode region than the anode region into the intermediate chamber. Through the use of that configuration it is possible to generate a comparatively concentrated sodium hydroxide solution in the cell. In the authoritative literature it is also mentioned that it would be possible to use, in place of one intermediate chamber, two or more such intermediate chambers which are equipped in the direction of the cathode chamber with cationic exchanger membranes, that are permeable to water to an increasingly poorer extent. In that way, the sodium hydroxide solution in the cathode chamber is concentrated even more. However, in practice such a solution is not used because of the associated difficulties in achieving a satisfactory efficiency of flow.

SUMMARY OF THE INVENTION

It is accordingly an object of the invention to provide a method and an electrodialysis cell for the simultaneous production of acid and base through the electrodialytic splitting of a corresponding salt in an aqueous solution using an electrodialysis cell, which overcome the hereinaforementioned disadvantages of the heretofore-known methods and devices of this general type and with which unwanted anode effects can be avoided and acids and alkalis can be produced with comparatively high concentrations and high purity. In particular, it is an object of the method according to the invention to produce, from sodium chloride solutions, hydrochloric acid of high purity and in concentrations which were heretofore not accessible with electrodialytic measures on an industrial scale.

With the foregoing and other objects in view there is provided, in accordance with the invention, a method for the simultaneous production of acid and base of high purity by the electrodialytic splitting of a corresponding salt in aqueous solution with an electrodialysis cell, which comprises providing a cathode chamber having a cathode, an inlet opening and at least one outlet opening for fluids. A salt chamber is separated from the cathode chamber by a cationic exchanger membrane. The salt chamber has an inlet opening and an outlet opening for conducting a salt solution. An acid is formed in an acid chamber separated from the salt chamber by an anionic exchanger membrane. The acid chamber does not contain an anode. An anode chamber is separated from the acid chamber by a cationic exchanger membrane through which protons required for forming the acid pass from the anode chamber into the acid chamber. The anode chamber has an inlet opening and an outlet opening for a liquid proton carrier flowing through the anode chamber. The anode chamber has a hydrogen-consuming anode for converting hydrogen into protons to an extent required for forming the acid. An electrical voltage is applied between the anode and the cathode for maintaining an electrodialytic process. Cations of a salt travel under the effect of the electrical field, from the salt chamber, through the cationic exchanger membrane into the cathode chamber and form a base there with $OH^-$-ions produced by catholytic splitting of water into hydrogen and $OH^-$-ions. Simultaneously, anions of the salt travel from the salt chamber, under the effect of the electrical field, through the anionic exchanger membrane into the acid chamber and form the acid there with protons formed analytically from hydrogen at the hydrogen-consuming anode.

With the objects of the invention in view, there is also provided an electrodialysis cell for the simultaneous production of acid and base of high purity from a corresponding salt by electrodialysis, comprising a cathode chamber having a cathode, an inlet opening and at least one outlet opening for fluids. A salt chamber is separated from the cathode chamber by a cationic exchanger membrane. The salt chamber has an inlet opening and an outlet opening for conducting a salt solution. An acid chamber in which an acid is formed is separated from the salt chamber by an anionic exchanger membrane and does not contain an anode. An anode chamber is separated from the acid chamber by a cationic exchanger membrane through which protons required for forming the acid pass from the anode chamber into the acid chamber. The anode chamber has an inlet opening and an outlet opening for a liquid proton carrier flowing through the anode chamber and a hydrogen-consuming anode for converting hydrogen into protons to an extent required for forming the acid. A device applies an electrical voltage between the anode and the cathode for maintaining an electrodialytic process. The device simultaneously causes cations of a salt to travel under the effect of the electrical field, from the salt chamber, through the cationic exchanger membrane into the cathode chamber and form a base there with OH⁻-ions produced by catholytic splitting of water into hydrogen and OH⁻ions, and causes anions of the salt to travel from the salt chamber, under the effect of the electrical field, through the anionic exchanger membrane into the acid chamber and form the acid there with protons formed from hydrogen at the hydrogen-consuming anode.

The chamber in which the acid is formed is separated from the anode region by a cationic exchanger membrane due to the introduction of a fourth chamber into the known three-chamber cell. This avoids a situation where component parts which are located in the chamber in which the acid is formed and which could enter into electrochemical reactions at the anode arrive at the anode and are converted there to form disturbing impurities which remain in the acid. An example of such an impurity is elemental, dissolved chlorine which can be formed by the discharging of chloride ions at the anode. very generally, with the suggested configuration very pure acids can be produced because only the substances which can pass through the cationic exchanger membrane out of the anode chamber and which can pass through the anionic exchanger membrane out of the middle, salt-carrying chamber can arrive by way of the membranes, acting in an ion-selective manner, in the region in which the acid is formed. Moreover, as tests have shown, the service life of the anode is increased several times with the new configuration.

It is also surprisingly possible for the first time, with the method and device according to the invention, to use an electrodialytic device to produce hydrochloric acid on an industrial scale, having a concentration which amounts to over 10% by weight HCl in the acid. Efforts by the inventors to obtain pure hydrochloric acid with concentrations over 10% by weight HCl with conventional three-chamber systems had failed. With the new cell structure it is now possible to produce hydrochloric acid with concentrations to over 20% by weight HCl in the hydrochloric acid and at the same time sodium hydroxide solution with concentrations over 30% by weight NaOH in the alkali. The method can also be carried out with two or more electrodialysis cells connected in parallel. The method operates particularly effectively if two or more electrodialysis cells are connected in series.

In order to carry out the method, the solution of a salt, for example the aqueous solution of NaCl, NaBr, KCl, KBr, KNO₃, NaNO₃ or an acetate which is preferably somewhat acidified, is conducted into the chamber of the electrodialysis cell which is limited on one side by a cationic exchanger membrane and on the other side by an anionic exchanger membrane. The chamber which contains the cathode and in which the base or alkali is formed, is connected to the cationic exchanger membrane. The chamber in which the acid is formed is connected to the anionic exchanger membrane. However, this chamber does not contain any anode. The anode is located in a further, fourth chamber which is connected to the chamber in which the acid is formed. Both latter chambers are separated by a cationic exchanger membrane. When the salt solution passes through the chamber into which it has been introduced, cations of the salt dissolved in it constantly pass through the cationic exchanger membrane into the cathode chamber of the cell. The cathode can be formed of any material which is resistant to alkalis and which is suitable for the reaction:

$$2\ H_2O + 2\ e^- \rightarrow H_2 + 2\ OH^-.$$

Such electrodes are commercially obtainable and are formed, for example, of nickel or of titanium and are activated with precious metal oxides from the group Pt, Pd, Rh, Ru, Ir, Re, Au or with titanium oxides. Advantageously, the cathodes which are used have as low an overvoltage as possible for the aforementioned reaction for the formation of hydrogen. A commercially available nickel cathode activated without the addition of foreign elements or foreign oxides has proven to be particularly advantageous. A diluted aqueous solution of the base is in the cathode chamber. A portion of the water of the solution is split at the cathode into hydroxyl ions and hydrogen to the extent that cations enter into the cathode chamber. The cations form the base together with the hydroxyl ions. The diluted solution is concentrated by this process. The alkali is continuously drawn off from the cathode chamber. The hydrogen which is likewise produced is taken and is supplied from the cathode chamber by a pipeline to the anode, which is constructed as a hydrogen-consuming anode, for conversion into positively charged hydrogen ions, that are referred to below as protons. Negative charges in the form of anions of the salt pass through the anionic exchanger membrane into the chamber in which the acid is formed, to the extent that positive charges in the form of cations pass into the cathode chamber. A diluted proton acid flows through the chamber in which the acid is formed. This proton acid is characterized by the anion which is also the anion of the salt that is to be electrodialytically split. The protons which are required for forming the acid enter from the anode chamber through the cationic exchanger membrane into the chamber in which the acid is formed, to the extent that anions enter into this chamber. The diluted acid which is initially present in the chamber is concentrated by this acid formation process. To the extent that protons travel into the chamber in which the acid is produced, the corresponding number of protons is formed from hydrogen at the hydrogen-consuming anode.

Any purchasable anode which is suitable for generating protons from water could be used as the anode. However, depolarized hydrogen-consuming electrodes are used, with the aid of which protons can be generated from gaseous hydrogen. A lower cell voltage can be used with the use of this anode type, because only the standard hydrogen potential of 0 volt is required for the conversion of hydrogen into protons. However, with water-decomposing anodes the higher potential of +1.21 V is required for the reaction $2\ H_2O \rightarrow 4\ H^+ + O_2$. Suitable gas diffusion anodes can be purchased (for example from the firm E-TEK, Inc., Natick, Mass.). A diluted proton acid which can be dissociated well, preferably an acid from the group sulfuric acid, perchloric acid, phosphoric acid, is disposed in the anode chamber as a transport medium for the protons. This acid is not consumed. Nevertheless, it is advantageous to circulate it by pumping. Membranes made from a polymer or copolymer, which is doped with an anionic ligand, for example of the sulphonic acid group, and which has been produced from monomers from the group tetrafluoroethylene, hexafluoropropylene, monochlorotrifluoroethylene, vinylidene fluoride and α,β,β-trifluorostyrene, are preferably used as the cationic exchanger membranes. Such membranes are commercially obtainable under the trademark NAFION (owned by Du Pont). The use of NAFION 117 for the cationic exchanger membrane between the anode chamber and the chamber in which the acid is formed, and of NAFION 324 for the cationic exchanger membrane which separates the salt-carrying chamber from the cathode chamber, has proven advantageous for the present invention. However, the invention is not restricted to the use of the named types of cationic exchanger membranes. Other types of cationic exchanger membranes, for example NAFION 115, Fumatec FKF, FKC, PKL and FKE or Tokuyama Alkali CMS, CIMS, CM-2 or Asahi Class SELEMION CAV, CSV can also be used. Commercially available membranes are likewise used as anionic exchanger membranes between the salt-carrying chamber and the chamber in which the acid is formed. The membrane ACM of Tokoyama Alkali has proven advantageous. However, other membranes such as, for example, the membranes AHA, AMH and ACS of Tokoyama Alkali, or the qualities FAB and FAA of the firm Fumatec or the membranes PCAPC Acid 35 and PC Acid 35 PEEK of the firm PCA GmbH or the membrane AAV of Asahi Glass SELEMION or the membrane ARA of Morgan, can also be used. The cell voltage when carrying out the method also depends on the cell construction, in addition to the standard potentials and overvoltage effects to be observed. It lies in the range of 1.5 to 6 V. It is advantageous to set the process temperature to 40° C. or more, preferably to 80° C. It is, of course, also possible to produce, according to the method of the invention, acids and alkalis from salts such as, for example, $Na_2SO_4$, $NaHSO_4$, or phosphates, which have already been electrodialyzed according to the known three-chamber method.

Other features which are considered as characteristic for the invention are set forth in the appended claims.

Although the invention is illustrated and described herein as embodied in a method and a device for the simultaneous production of acid and base of high purity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
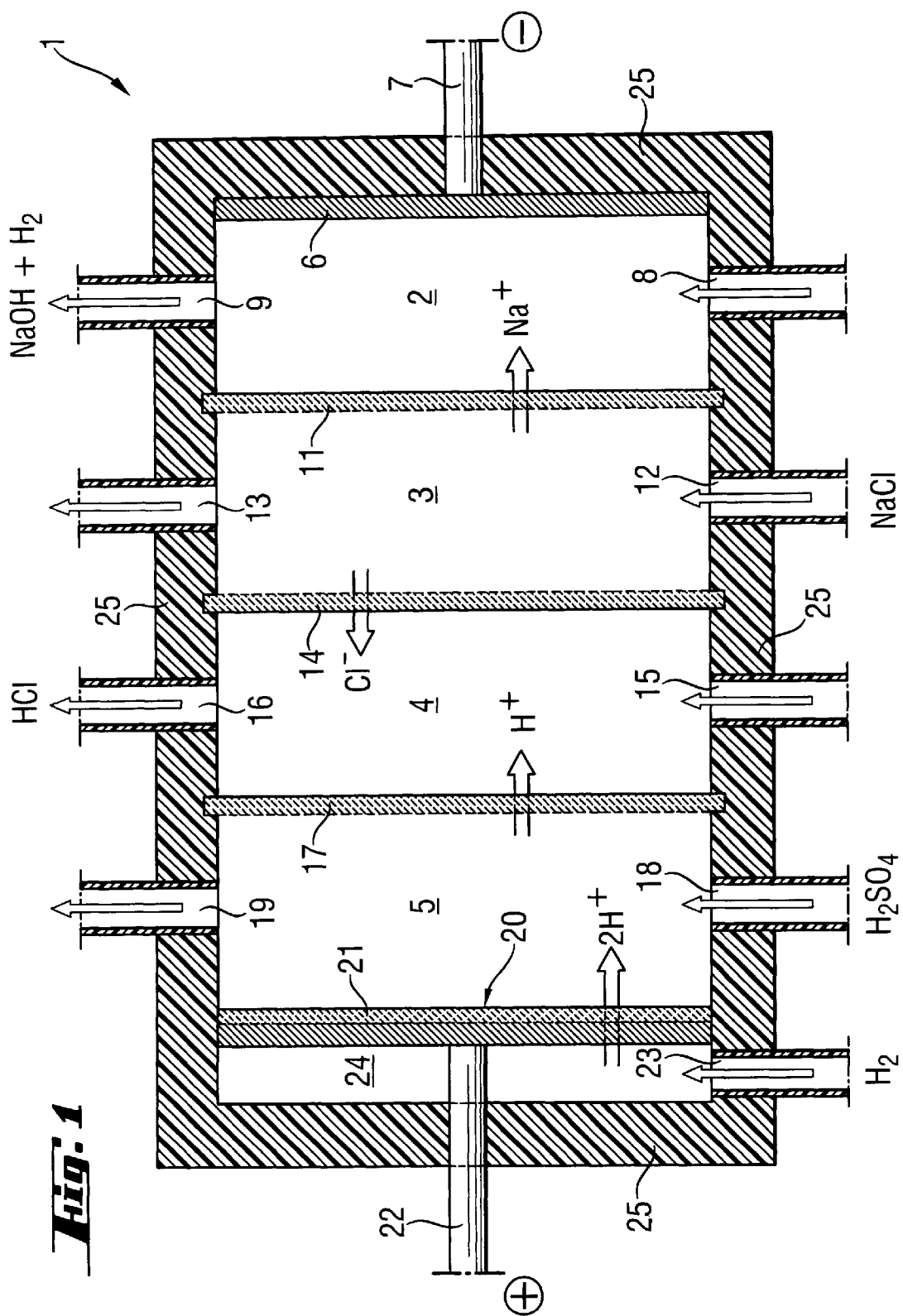
FIG. 1 is a diagrammatic, sectional view of an electrodialysis cell according to the invention.

Operation of an electrodialysis cell shown in FIG. 1 and the performance of a method illustrated in FIGS. 2 and 3 will be described by way of example with reference to obtaining hydrochloric acid and sodium hydroxide solution from sodium chloride. However, the invention is not restricted thereto.

Referring now to the figures of the drawings in detail and first, particularly, to FIG. 1 thereof, there is seen an electrodialysis cell 1 which has four chambers, namely a cathode chamber 2; a chamber 3, referred to below as a "salt chamber", through which sodium chloride solution flows; a chamber 4, referred to below as an "acid chamber", in which hydrochloric acid is formed; and an anode chamber 5. The cathode chamber 2 has a cathode 6 with a contact bar 7 for supplying electric current. The cathode 6 is formed of nickel and has an activated nickel surface. The contact bar 7 is likewise formed of nickel. In the cathode chamber 2, on one hand water is electrolytically split to form hydroxyl ions and hydrogen, and on the other hand sodium hydroxide solution is formed from the hydroxyl ions and sodium ions. The liquid which is to be electrolyzed enters into the cathode chamber 2 by way of an inlet opening 8. This liquid can be water. However, a diluted alkali, in this case sodium hydroxide solution, is preferably used. The sodium hydroxide solution which is formed, or the sodium hydroxide solution that is concentrated by way of the sodium hydroxide solution formation process, leaves the cathode chamber 2 through an outlet opening 9 together with the formed hydrogen. Cations, that is to say sodium ions in the present example, pass from the salt chamber 3 through a cationic exchanger membrane 11 into the cathode chamber 2. A solution of the salt which is to be electrodialytically split flows through the salt chamber 3. In the present case this is a concentrated solution of sodium chloride. The NaCl solution passes through an inlet opening 12 into the salt chamber 3 and leaves this chamber 3, after depletion of $Na^+$-ions and $Cl^-$-ions has taken place, through an outlet opening 13. Chloride ions pass from the salt chamber 3 through an anionic exchanger membrane 14 into the acid chamber 4, to the extent that cations travel through the cationic exchanger membrane 11 into the cathode chamber 2, forming hydrochloric acid with protons within the acid chamber 4. Water, or preferably a diluted hydrochloric acid, is introduced into the acid chamber 4 through an inlet opening 15. The hydrochloric acid is then concentrated by the hydrochloric acid formation process and leaves the chamber 4 through an outlet opening 16. Protons for the process of forming hydrochloric acid come from the anode chamber 5 in which they are formed. They pass from the anode chamber 5 through a cationic exchanger membrane 17 into the hydrochloric acid chamber 4. A diluted proton acid, in the present case sulfuric acid or perchloric acid, flows through the anode chamber 5. The acid passes through an inlet opening 18 into the anode chamber 5 and leaves it through an outlet opening 19. In practice, this acid is not consumed. It serves only as a transport device for the protons which are produced from hydrogen at a hydrogen-consuming anode 20. For this purpose, gaseous hydrogen is supplied to the hydrogen-consuming anode by a supply line 23 leading into a distributing region 24 which is formed of a thin, chambered fiber network. A conversion into simply positive hydrogen ions then takes place in the anode with the removal of electrons. The hydrogen-consuming anode 20 is depolarized and is bounded by a cationic exchanger membrane 21 on its side which faces the chamber 5. Current removal is symbolized herein by a bar 22. The depolarized hydrogen-consuming anode 20 is commercially obtainable. Walls 25 of the chambers 2, 3, 4, 5 of the electrodialysis cell 1 are formed of a material which is resistant to the media located in them.

Synthetic materials such as, for example, polyvinyl chloride, polypropylene, polyvinylidene fluoride, polytetrafluoroethylene or other perfluorinated or partially fluorinated synthetic materials which can also be reinforced by inlaid fibers or fiber composites or even metal parts, preferably steel parts, lined with one of the named synthetic materials, and rubber-lined steel, are preferably used for this purpose. In the present case, the walls 25 of the cell 1 were formed of polypropylene which was joined together in the form of non-illustrated blocks and plates that were worked so as to fit, and held together by likewise non-illustrated tension rods. Elements 7 and 22 provide a device for applying an electrical voltage between the anode 20 and the cathode 6 for maintaining the electrodialytic process.

Figure 2:
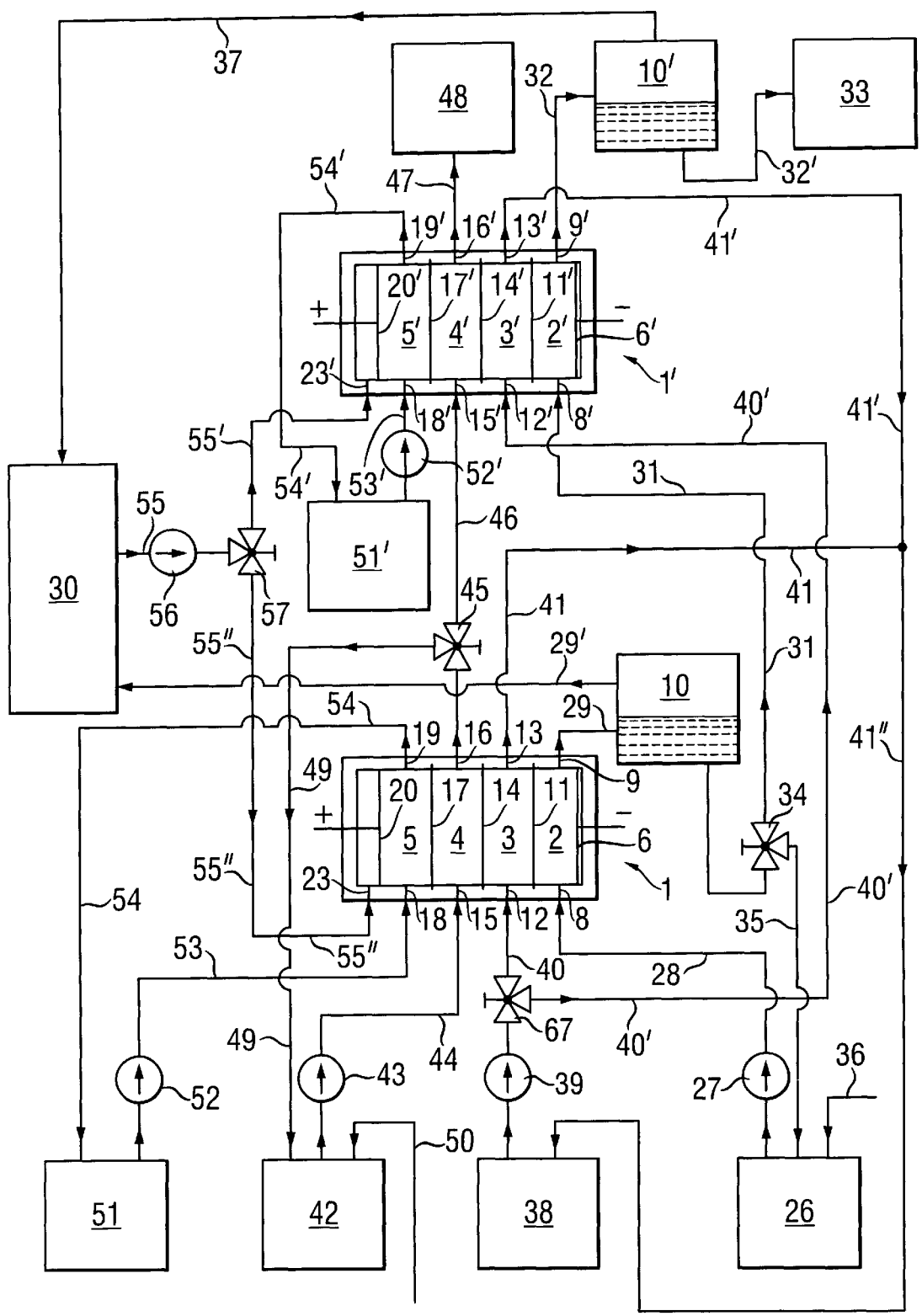
FIG. 2 is a schematic and block diagram of a circuit for carrying out a method according to the invention.

A flow chart which illustrates the method in FIG. 2 shows two electrodialysis cells 1, 1' connected in series. The structure of both cells 1, 1' corresponds to the cell described with reference to FIG. 1. A connection of two or more electrodialysis cells in series is advantageously used with the method according to the invention because the concentration effect in only one electrodialysis cell is comparatively small. In addition, the concentration effect is maximized both with the acid formation and with the base formation by connecting the cells in series. Of course, it is also possible to use only one electrodialysis cell. In this case, however, it is advantageous to conduct the acid or the alkali or both, where necessary, through the cell with the continuous method until the desired concentration in the receiver is achieved.

In the present case, initially a pump 27 is used to pump a diluted sodium hydroxide solution out of an intermediate and buffer container 26, through a pipeline 28 and the inlet opening 8, into the cathode chamber 2 of the electrodialysis cell 1. The alkali is concentrated in this chamber 2 to a certain degree by the catholytic formation of $OH^-$-ions and by $Na^+$-ions diffusing in from the salt chamber 3, that is to say by way of the new formation of alkali. Hydrogen is produced at the cathode 6 in parallel therewith. The hydrogen travels together with the sodium hydroxide solution through the outlet opening 9 and a pipeline 29 and arrives in a separating container 10. The hydrogen is conveyed from the container 10 through a pipeline 29' into a supply and buffer container 30 for hydrogen. Alkali from the separating container 10, which is only partially concentrated, arrives at a three-way valve 34, and from there a larger partial flow flows through a pipeline 31 and an inlet opening 8' into a cathode chamber 2' of the electrodialysis cell 1'. The alkali is concentrated further in this cathode chamber 2' by the process described above and is then conveyed through an outlet opening 9' and a pipeline 32 into a separating container 10'. The alkali is conveyed from there through a pipeline 32' into a collecting and storage container 33 for the alkali, the concentrating of which is complete. Hydrogen developed in this cathode chamber 2' arrives together with sodium hydroxide solution in the separating container 10' and travels from there, through a pipeline 37, to the supply and buffer container 30 for hydrogen. Another smaller partial flow of the alkali which is partially concentrated in the first cathode chamber 2 is drawn off at the three-way valve 34 and is returned through a pipeline 35 into the intermediate and buffer container 26. There, water is added to the returned alkali through a pipeline 36 in the same quantity as the volume of alkali which has flowed out of the second cathode chamber 2' and the concentration of which is complete. In this way, the process for forming sodium hydroxide solution and for concentrating this alkali, taking place in the cathode chambers 2, 2', remains in equilibrium in chemical engineering terms.

Sodium ions which are required for forming the sodium hydroxide solution come from a sodium chloride solution which is pumped by a pump 39 out of an intermediate and buffer vessel 38, through pipelines 40, 40' and through inlet openings 12, 12', into salt chambers 3, 3'. It is advantageous to ensure that a salt solution of the same, highest possible concentration as is located in the first chamber 3 advantageously also flows through the downstream chamber 3'. Therefore, the flow of the salt solution after the pump 39 is divided through the use of a three-way valve 67 into two equal flows. One of the flows is conducted by the pipeline 40 into the salt chamber 3 and the other by the pipeline 40' into the salt chamber 3' of the downstream cell 1'. In both chambers 3, 3' a depletion of the salt solution takes place by the electrodialytic separation of the salt. The salt is separated into $Na^+$-ions on one hand, which travel through the cationic exchanger membranes 11, 11' into the cathode regions 2, 2' and $Cl^-$-ions on the other hand, which migrate through the anionic exchanger membranes 14, 14' into the acid chambers 4, 4' of the two series-connected electrodialysis cells 1, 1'. The partially deionized solutions leave the salt chambers 3, 3' through outlet openings 13, 13' and are returned by pipelines 41, 41', 41" into the intermediate and buffer vessel 38. There they flow over a salt bed and are concentrated again. The salt solution is then conducted anew in the circulation through the salt chambers 3, 3'. Should it be necessary, although it has not been shown, the salt solution can also be conducted successively through both chambers 3, 3' and then back into the container 38.

In order to generate the hydrochloric acid, a pump 43 pumps a diluted hydrochloric acid out of an intermediate and buffer container 42, through a pipeline 44 and the inlet opening 15, into the acid chamber 4 of the electrodialysis cell 1. Hydrochloric acid is formed anew in this chamber 4 from the chloride ions which have passed through the anionic exchanger membrane 14 from the salt chamber 3 and from the protons which have migrated and traveled in through the cationic exchanger membrane 17 from of the anode chamber 5. The diluted hydrochloric acid is thus concentrated to a certain degree. The acid, which is only partially concentrated, leaves the acid chamber 4 through the outlet opening 16. A larger partial flow thereof arrives by way of a three-way valve 45, a pipeline 46 and the inlet opening 15' in an acid chamber 4' of the electrodialysis cell 1. In this acid chamber 41, the acid is concentrated further by the process described above and is then conveyed through an outlet opening 16' and a pipeline 47 into a collecting and storage container 48 for the hydrochloric acid, the concentration of which is complete. Another smaller partial flow of the partially concentrated acid is drawn off at the three-way valve 45 and is returned through a pipeline 49 into the intermediate and buffer container 42. There, as much water as a water balance of the cell requires is added to the returned hydrochloric acid through a pipeline 50. In this way, the process for forming hydrochloric acid and for concentrating this acid, which takes place in the acid chambers 4, 4', remains in equilibrium in chemical engineering terms.

According to another advantageous embodiment, in addition to the water which must be replaced, diluted hydrochloric acid, that originates as return acid from a further known concentration process subsequent to the method according to the invention, is supplied by way of the pipeline 50. The coupling of the method with this process will be discussed in more detail below. The concentrated acid collected in the collecting and storage container 48 can either continue to be used directly, or preferably, it can be concentrated to form concentrated acid according to one of the known methods. The protons which are required for forming the hydrochloric acid in the acid chambers 4, 4' are formed from hydrogen in anode chambers 5, 5' at respective hydrogen-consuming anodes 20, 20'. The hydrogen required for this purpose is supplied from the hydrogen tank 30 to the hydrogen-consuming anodes 20, 20' through a pump 56, pipelines 55, 55', 55", a three-way valve 57 and supply lines 23, 23'. Diluted sulfuric acid, which is located in containers 51 and 51', is used in anode chambers 5, 5' as a transport device or carrier for the protons. The diluted sulfuric acid is pumped from these containers by pumps 52 and 52' and travels through pipelines 53 and 53' and inlet openings 18 and 18' to the anode chambers 5 and 5'. It returns into the containers 51 and 51' through outlet openings 19, 19' and pipelines 54 and 54'. Instead of the two acid circulations shown in this figure, with the two containers 51 and 51', one circulation can also be used, in which the chambers 5 and 5' are loaded from only one non-illustrated container and in which the acid flows back into the one container after flowing through the chambers 5, 5'. The protons respectively formed at the hydrogen-consuming anodes 20 and 20' replace the protons which have changed over from the sulfuric acid by the cationic exchanger membranes 17 and 17' leading into the acid chambers 4, 4'. This takes place simultaneously to the extent that hydroxyl ions have been formed at cathodes 6 and 6'.

The further concentration of the hydrochloric acid which is obtained by the electrodialysis process, to form concentrated hydrochloric acid, takes place in a particularly advantageous manner by coupling the method according to the invention with a known method. A schematic diagram illustrating the method can be seen in FIG. 3. The electrodialytic concentration of the hydrochloric acid is carried out at temperatures of over 40° C., preferably in the region of 80° C. The 80° C. hot acid exiting from the electrodialysis cell 1 in FIGS. 2 and 3 or the 80° C. hot acid collected in the container 48 in FIG. 2, having a concentration which must lie above an azeotropic concentration, is expanded through the use of a pressure-maintaining device or throttle 59 into a container or vessel 60 in which a partial vacuum prevails in comparison with a pipeline upstream of the pressure-maintaining device 59. This partial vacuum is set through the use of a pump 62 and a pressure control device 61, 61'. A heating device 58 which is used to heat the hydrochloric acid originating from the electrodialysis cell 1, should it not have a sufficiently high temperature, is advantageously located upstream of the pressure-maintaining device 59. In running operation, however, the method operates largely autothermally. The portion of the liquid evaporated upon the expansion of the hydrochloric acid into the container or vessel 60 contains more hydrogen chloride than the hydrochloric acid supplied for evaporation. Accordingly, after condensing of acid vapor in a cooler 63, a concentrated hydrochloric acid of at least 30% by weight HCl in the acid is obtained and collected in container 64. The portion of the liquid which has not evaporated, that collects in the expansion vessel or container 60, is formed of diluted hydrochloric acid. It is again supplied to the electrodialysis cell 1 through the use of a pump 66 for renewed concentration. Water can be supplied to the diluted acid by a three-way valve 65, if the supply of water, which always takes place in parallel with the passage of the ions through the membranes 14 and 17 in FIG. 1, is not sufficient in order to compensate for a liquid loss produced by the removal of the concentrated hydrochloric acid by the container 64.

The method will be explained further in the following text with reference to examples:

EXAMPLE 1

An electrodialysis cell which was used for a test described below had the following structure:

cationic exchanger membrane between cathode chamber and salt chamber: Nafion 324, active membrane surface 0.35 m$^2$;

anionic exchanger membrane between salt chamber and hydrochloric acid chamber: ACM of Tokuyama Alkali, active membrane surface 0.35 m$^2$;

cationic exchanger membrane between hydrochloric acid chamber and anode chamber: Nafion 117, active membrane surface 0.35 m$^2$; cathode: expanded nickel metal, activated;

hydrogen-consuming anode: gas diffusion anode, manufacturer De Nora;

only one electrodialysis cell was used, through the chamber of which the following liquid flows were conducted:

cathode chamber: NaOH, 160 l/hour;

salt chamber: NaCl-solution, 160 l/hour, concentration at inlet: 20% by weight NaCl in the solution; acid chamber: HCl, 160 l/hour;

anode chamber: sulfuric acid, 160 l/hour, concentration: 15% by weight H$_2$SO$_4$ in the acid.

The electrolytes had a temperature of 53° C., the electrical voltage between anode and cathode amounted to 3.5 V, the cell current was fixed at 700 A and the specific current load amounted to 2 kA/m$^2$.

The test was begun both in the cathode chamber and in the hydrochloric acid chamber with deionized water. The maximum hydrochloric acid concentration achieved at the output of the hydrochloric acid chamber amounted to 23.5% by weight and the concentration of sodium hydroxide solution at the output of the cathode chamber amounted to 33% by weight. The maximum acid concentration is determined by the quantity of the water which passes together with the protons through the cationic exchanger membrane into the hydrochloric acid circulation. Membranes with less permeability for water could make the production of more highly concentrated acids possible in keeping with the method according to the invention.

EXAMPLE 2

Figure 3:
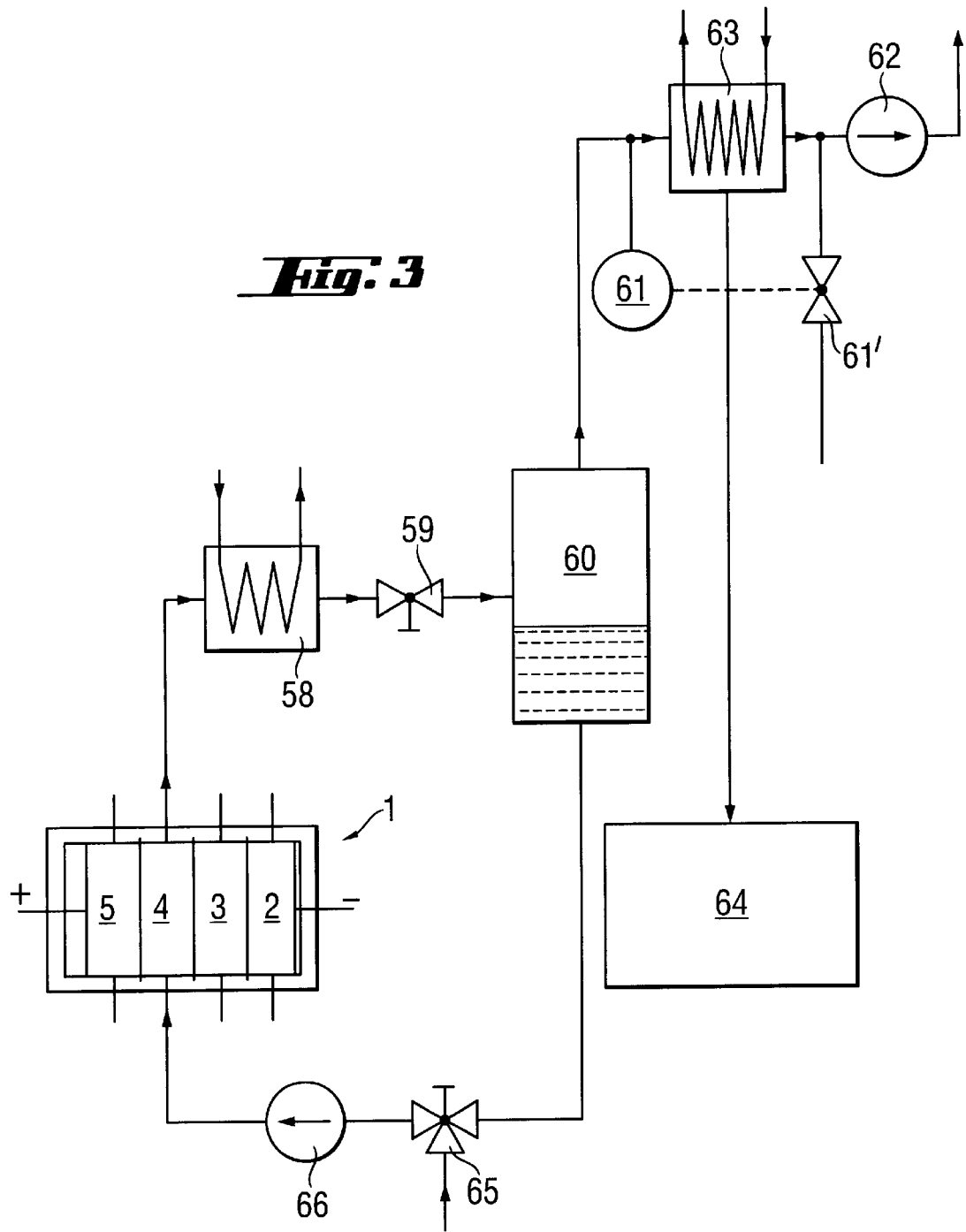
FIG. 3 is a schematic and block diagram of a circuit which illustrates coupling of the method according to the invention with a concentration method for the production of hydrochloric acid.

This example shows how hydrochloric acid, which has been concentrated in an electrodialysis cell according to exemplary embodiment 1, can be processed to form concentrated hydrochloric acid through the use of an expansion/condensation method, as has been described with regard to FIG. 3. An 80° C. hot hydrochloric acid with a concentration of 23.5% by weight was drawn off from the electrodialysis cell, the data of which is indicated in Example 1. The hydrochloric acid was drawn off at a quantity of 150 l/hour, heated to 84° C. in an electrical heating device and then expanded by way of a throttle into a tank in which a pressure of 0.2 bar absolute prevailed. In this procedure a portion of the hydrochloric acid evaporated. This hydrochloric acid vapor was drawn off from the tank and condensed in a cooler. The hydrochloric acid obtained in this way had a concentration of 30% by weight HCl in relation to the acid and 3.14 kg of such an acid were obtained per hour. The portion of the hydrochloric acid which did not evaporate and which remained in liquid form in the tank had a concentration of 23.4% by weight HCl. It was returned into the electrodialysis cell at a temperature of 70 to 72° C. Upstream of the electrodialysis cell, 2.2 kg of water per hour were added to this depleted hydrochloric acid as a replacement for the removed quantity of concentrated hydrochloric acid. In the cell, the acid was heated again by the electrolytic process and concentrated. As can be seen, the method operates largely autothermally.

Tests show that, with the method according to the invention, through the use of the electrodialysis cell in accordance with the invention, on an industrial scale, hydrochloric acid can be generated with a concentration of over 20% by weight and sodium hydroxide solution with a concentration of over 30% by weight. Furthermore, it is seen that by coupling the inventive method with a known method, through utilization of heating of the electrodialytically generated hydrochloric acid according to the method, concentrated hydrochloric acid can also be produced in a simple and effective manner.

The method according to the invention can also be transferred to other salt/acid/alkali systems.

The advantages of the invention are:
pure acids and pure alkalis are produced from the corresponding salts;
the discharging of anions of the acid-base pair at the anode is avoided. There is therefore, for example, the possibility of producing completely halogen-free hydrohalic acids, specifically chlorine-free hydrochloric acid; and
for the first time, hydrochloric acid with concentrations of over 10% by weight HCl, can be produced on an industrial scale using an electrodialytic device.

What is claimed is:

1. A method for a simultaneous production of acid and base of high purity by an electrodialytic splitting of a corresponding water-soluble halide-containing salt without a simultaneous formation of a halogen from halide ions of the salt with an electrodialysis cell, which comprises:
providing a cathode chamber having a cathode, an inlet opening and at least one outlet opening for fluids;
providing a salt chamber separated from the cathode chamber by a cationic exchanger membrane, the salt chamber having an inlet opening and an outlet opening for conducting a salt solution;
forming an acid in an acid chamber separated from the salt chamber by an anionic exchanger membrane, the acid chamber not containing an anode, thereby avoiding formation of halogen by anodic oxidation of halide anions within the acid chamber;
providing an anode chamber separated from the acid chamber by a cationic exchanger membrane through which protons required for forming the acid pass from the anode chamber into the acid chamber, the anode chamber having an inlet opening and an outlet opening for a liquid proton carrier flowing through the anode chamber, and the anode chamber having a hydrogen-consuming anode for converting hydrogen into protons to an extent required for forming the acid, the side of the hydrogen-consuming anode facing the anode chamber being bounded to a further cationic exchanger membrane;
applying an electrical voltage between the anode and the cathode for maintaining an electrodialytic process;
causing cations of a halide-containing salt to travel under the effect of the electrical field, from the salt chamber, through the cationic exchanger membrane into the cathode chamber and form a base there with OH$^-$-ions produced by catholytic splitting of water into hydrogen and OH$^-$-ions; and
simultaneously causing anions of the halide-containing salt to travel from the salt chamber, under the effect of the electrical field, through the anionic exchanger membrane into the acid chamber and form the acid there with protons formed analytically from hydrogen at the hydrogen-consuming anode.

2. The method according to claim 1, which further comprises generating from a solution of sodium chloride, without a simultaneous formation of chlorine, hydrochloric acid of high purity in a concentration of more than 10% by weight HCl and a sodium hydroxide solution of more than 10% by weight NaOH.

3. The method according to claim 2, which further comprises generating hydrochloric acid with a concentration of at least 20% by weight HCl and sodium hydroxide solution with a concentration of at least 25% by weight NaOH, from sodium chloride.

4. The method according to claim 1, which further comprises conducting a liquid containing protons in solution through the anode chamber.

5. The method according to claim 4, which further comprises conducting a proton carrier selected from the group consisting of diluted sulfuric acid, orthophosphoric acid and perchloric acid through the anode chamber.

6. The method according to claim 1, which further comprises supplying hydrogen formed in the cathode chamber to the hydrogen-consuming anode for forming protons.

7. The method according to claim 1, which further comprises generating the acid and base at a temperature above 40° C.

8. The method according to claim 1, which further comprises it is carried out with at least two electrodialysis cells in series connection.

9. The method according to claim 1, which further comprises connecting at least two electrodialysis cells in parallel.

10. The method according to claim 1, which further comprises expanding hydrochloric acid having a concentration above the azeotropic point of hydrochloric acid, at least at a given temperature, using a pressure-maintaining device, into a region having a lower prevailing pressure than upstream of the pressure-maintaining device, resulting in a portion of the hydrochloric acid evaporating and vapor having a higher content of hydrogen chloride, and obtaining hydrochloric acid after condensation having a higher concentration than hydrochloric acid obtained by an electrodialytic enrichment process, and resupplying a portion of the hydrochloric acid not having evaporated and having a reduced concentration of hydrogen chloride, to the electrodialysis cell.

11. An electrodialysis cell for the simultaneous production of acid and base of high purity from a corresponding water-soluble halide-containing salt without a simultaneous formation of a halogen from the halide ions of the salt by way of electrodialysis, comprising:
a cathode chamber having a cathode, an inlet opening and at least one outlet opening for fluids;
a salt chamber separated from said cathode chamber by a cationic exchanger membrane, said salt chamber having an inlet opening and an outlet opening for conducting a salt solution;
an acid chamber in which an acid is formed, said acid chamber separated from said salt chamber by an anionic exchanger membrane, and said acid chamber not containing an anode, thereby avoiding formation of halogen by anodic oxidation of halide anions within the acid chamber;

an anode chamber separated from said acid chamber by a cationic exchanger membrane through which protons required for forming the acid pass from said anode chamber into said acid chamber, said anode chamber having an inlet opening and an outlet opening for a liquid proton carrier flowing through said anode chamber, and said anode chamber having a hydrogen-consuming anode for converting hydrogen into protons to an extent required for forming the acid, the side of the hydrogen-consuming anode facing the anode chamber being bounded to a further cationic exchanger membrane; and a device for applying an electrical voltage between said anode and said cathode for maintaining an electrodialytic process, said device simultaneously causing cations of a halide-containing salt to travel under the effect of the electrical field, from said salt chamber, through said cationic exchanger membrane into said cathode chamber and form a base there with $OH^-$-ions produced by catholytic splitting of water into hydrogen and $OH^-$-ions, and causing anions of the halide-containing salt to travel from said salt chamber, under the effect of the electrical field, through said anionic exchanger membrane into said acid chamber and form the acid there with protons formed from hydrogen at the hydrogen-consuming anode.

* * * * *